J. J. TYSON.
ELECTRIC BRAKE.
APPLICATION FILED MAR. 9, 1915.
1,176,625.
Patented Mar. 21, 1916.
3 SHEETS—SHEET 1.
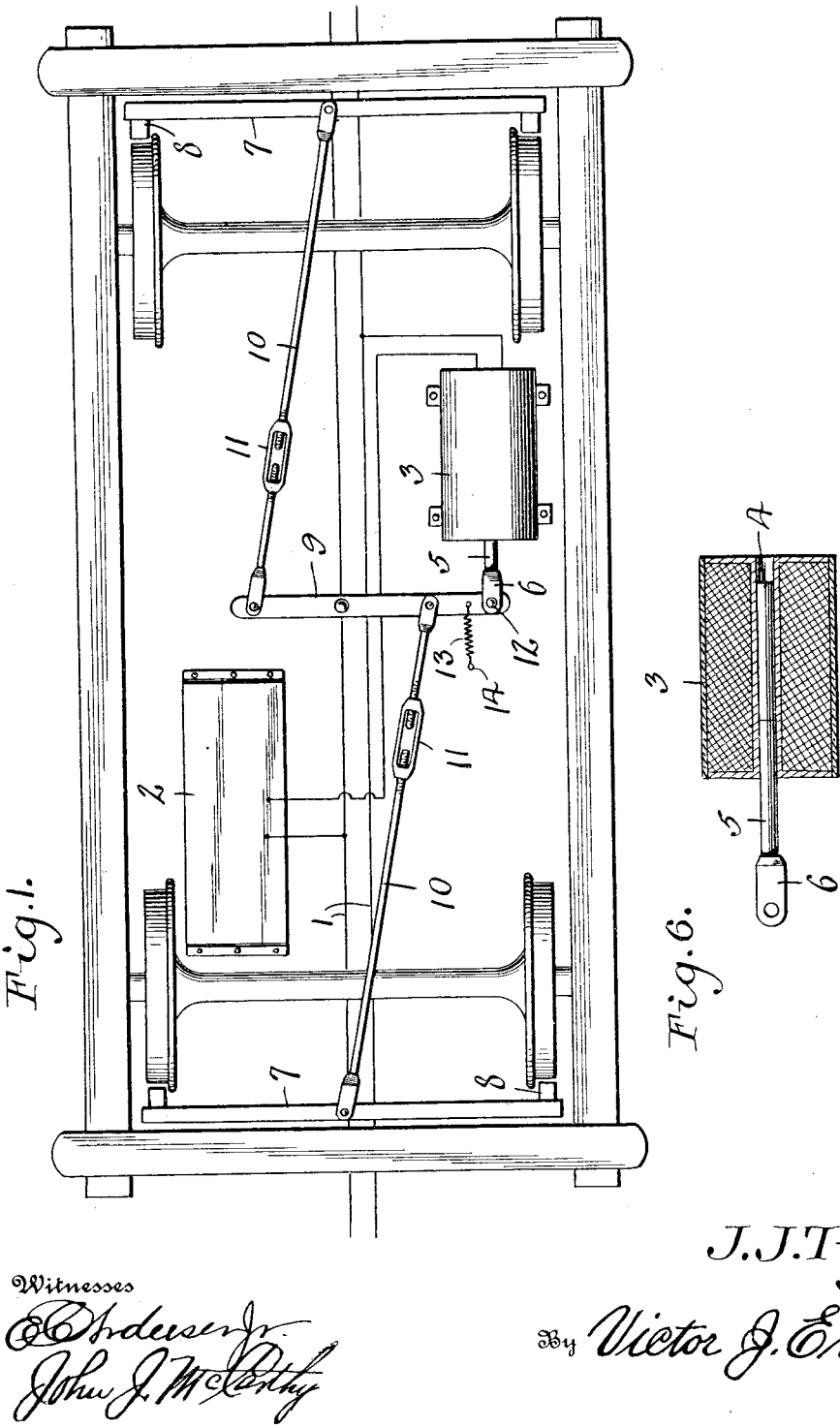
Witnesses
Inventor
J. J. Tyson,
By Victor J. Evans
Attorney J. J. TYSON.
ELECTRIC BRAKE.
APPLICATION FILED MAR. 9, 1915.
1,176,625.
Patented Mar. 21, 1916.
3 SHEETS—SHEET 2.
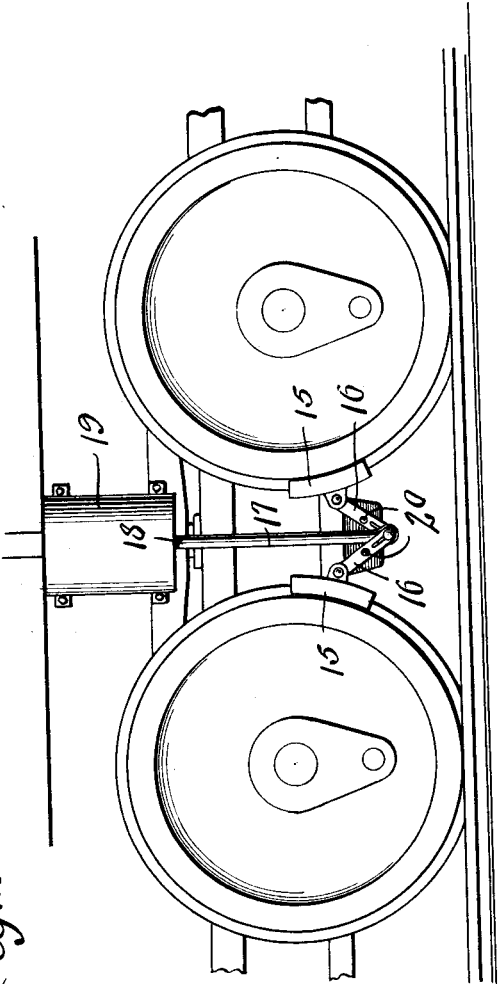
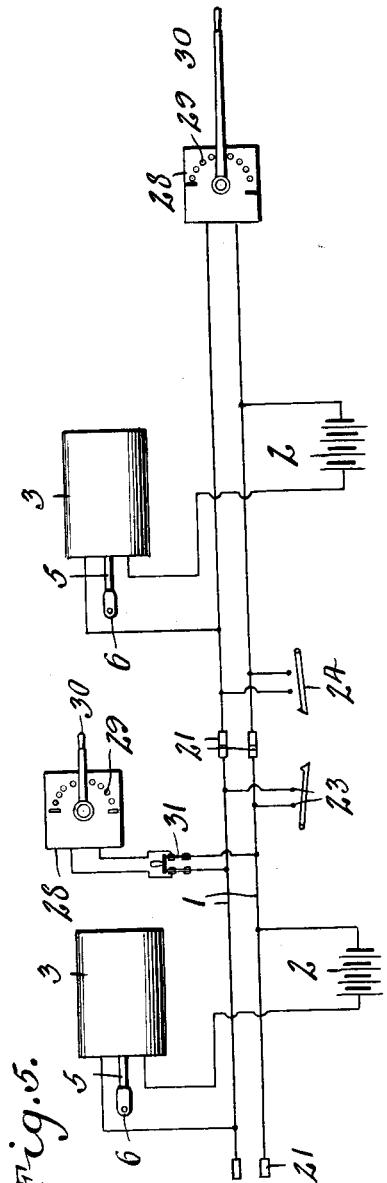

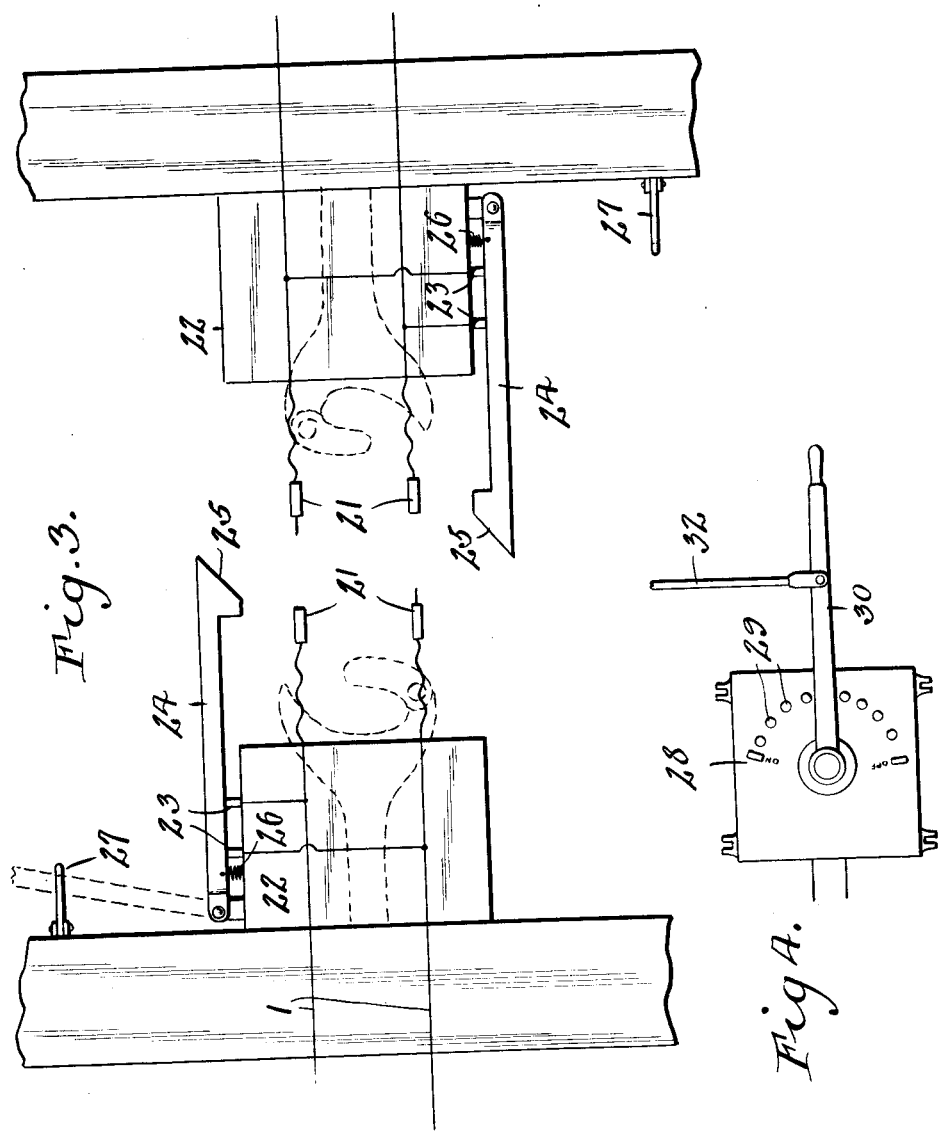

UNITED STATES PATENT OFFICE.

JAMES JORDAN TYSON, OF MONTGOMERY, ALABAMA, ASSIGNOR OF ONE-HALF TO JOHN RUSSELL TYSON, OF MONTGOMERY, ALABAMA.

ELECTRIC BRAKE.

1,176,625.  Specification of Letters Patent.  Patented Mar. 21, 1916.

Application filed March 9, 1915. Serial No. 13,254.

*To all whom it may concern:*

Be it known that I, JAMES JORDAN TYSON, a citizen of the United States of America, residing at Montgomery, in the county of Montgomery and State of Alabama, have invented new and useful Improvements in Electric Brakes, of which the following is a specification.

This invention relates to improvements in electric brake apparatus for steam and electric railway trains.

In carrying out the present invention, it is my purpose to improve and simplify the general construction of electric brake apparatus for trains and to provide an electric brake which will operate efficiently and effectively for its intended purpose and which may be put into action manually by the engineer or motorman of the train and which will operate automatically in the event of the cars of the train uncoupling so that the disconnected sections of the train will be brought to an immediate stop, thereby eliminating the danger incident to one or more broken sections of a train running wild.

It is also my purpose to provide brake mechanism which will embody comparatively few parts and these so correlated and arranged as to reduce the possibility of derangement to a minimum.

With the above and other objects in view, the invention consists in the construction, combination and arrangement of parts hereinafter set forth in and falling within the scope of the claim.

In the accompanying drawings: Figure 1 is a bottom plan view of a car equipped with electric brake apparatus constructed in accordance with the present invention. Fig. 2 is a fragmentary side elevation of a locomotive equipped with electric brake apparatus constructed in accordance with the present invention. Fig. 3 is a fragmentary plan view showing the connections between adjacent cars of a train. Fig. 4 is a plan view of the controller. Fig. 5 is a diagrammatic view of the brake apparatus. Fig. 6 is a longitudinal sectional view through the car carried electroresponsive device.

Each coach, freight car and car of similar construction is equipped with a pair of conductors 1 capable of carrying an electric current and secured to the bottom of the car and extending longitudinally thereof. Connected in circuit with each pair of conductors 1 and in series with each other are a battery 2 or other suitable source of electrical energy and electroresponsive device 3 secured to the bottom of the car. In the present instance, the electroresponsive device 3 is in the form of a solenoid magnet equipped with a core 4 and connected with one end of the core 4 and projecting outwardly of the adjacent extremity of the solenoid is a stem 5 having the outer end thereof forked or bifurcated as at 6. Suspended from the bottom of the car adjacent to the extremities thereof are brake beams 7 having the extremities thereof equipped with brake shoes 8 designed to engage the peripheries of the respective wheels of the car. Pivoted between its ends to the bottom of the car at the center of the latter is a brake lever 9 and pivotally secured to the brake lever 9 at opposite sides of the pivot point thereof are the inner ends of brake rods 10 projecting toward the respective brake beams 7 and having the outer ends thereof pivotally connected to such brake beams. In this instance, each brake rod 10 is equipped with a turn buckle 11 whereby the rod may be lengthened or shortened as desired. One end of the brake lever 9 is disposed between the forked ends 6 of the stem 5 and connected thereto by means of a pivot pin 12, while connected with the lever 7 adjacent to the pivot pin 12 is one end of a coiled retractile spring 13 disposed at the side of the lever opposite from the electroresponsive device 3 and having the remaining end thereof fastened to the bottom of the car as at 14. By means of this construction, it will be seen that when the solenoid is energized the core will be drawn into the same with the effect to pull the stem 5 and so swing the brake lever 9 about its fulcrum. In the swinging movement of the brake lever the rods 10 are moved in relatively opposite directions and draw the brake beams 7 toward the adjacent wheels to engage the brake shoes with the peripheries of such wheels and so check the speed of the car. When the electroresponsive device is deënergized the spring 13 reacts and restores the parts to normal position, thereby relieving the wheels of the influence of the brake shoes and permitting the car to move freely.

The brake mechanism of the locomotive comprises brake shoes 15 disposed between the drivers of the locomotive and movable into and out of engagement with the drivers respectively. Secured to the respective brake shoes 15 are arms 16 projecting toward each other and having the meeting ends thereof pivotally connected to each other and to the lower end of a vertical stem 17. The upper end of the stem 17 is equipped with a core 18 disposed within a solenoid 19. When the solenoid 19 is energized the core is drawn into the same, thereby elevating the stem 17 and actuating the arms 16 to engage the brake shoes 15 with the tires of the respective drive wheels. On the other hand, when the solenoid 19 is deënergized the core 18 gravitates to lowered position, thereby swinging the arms 16 to relieve the drivers of the influence of the brake shoes. In the present instance, each arm 16 is pivoted between its ends as at 20 to an appropriate support and when the stem 17 is moved upwardly the arms 16 swing outwardly while when the stem is lowered the arms swing toward each other to released position.

The ends of the conductors 1 carried by each car and the locomotive project beyond the respective extremities of the car and are equipped with suitable connectors 21 whereby the conductors on one car may be connected to those of adjoining cars when the cars are coupled in train formation. The outer extremities of the conductors on each car pass through boxes 22 and secured to one side of each box is a pair of contacts 23 connected with the respective conductors 1. The contacts 23 at one end of the car are disposed upon the side of the box opposite from that carrying the contacts at the opposite end of the car and pivotally mounted upon the side of each box carrying the contacts is a lever 24 having the outer end thereof formed with a nose 25. The lever 24 is adapted to bridge the contacts 23 and is adapted to be actuated into engagement with such contacts by means of a spring 26 acting thereon. To hold each lever 24 out of engagement with the corresponding contacts, such lever is swung about its pivotal connection with the box 22 against the action of the spring 26 and engage with a hook 27 secured to the adjacent end of the car. When adjoining cars are coupled together in train formation by means of the car couplers, the companion connectors 21 are secured to one another so that the conductors 1 throughout the length of the train will be electrically connected to one another. The levers 24 are relieved of the influence of the hooks 27 and as the levers on each car are disposed at the relatively opposite sides of the respective boxes 22, the levers on the boxes of adjoining cars are likewise disposed as clearly illustrated in Fig. 3 and when the levers at the meeting ends of the cars are relieved of the influence of the hooks the springs 26 react and tend to swing the levers into engagement with the contacts 23. However, as the cars are coupled together the noses 25 on the outer ends of the respective levers engage the side walls of the boxes 22 so that the contacts 23 are disengaged by the levers.

The locomotive of the train is equipped with a controller 28 embodying a resistance grid 29 and a lever 30 pivoted at the center of the arc of the resistance grid and movable over the latter. The lever 30 and resistance grid 29 are connected with the respective conductors 1 of the locomotive and when the lever 30 is at its limit of movement in one direction, such lever is disengaged from the resistance grid, thereby holding the brake system deënergized, while when the lever is at its limit of movement in the opposite direction the full current flows through the established circuit.

In practice, when it is desired to apply the brakes to the train, the lever 30 is swung over the resistance grid 29, thereby bridging the lines of conductors 1 throughout the length of the train so that the electroresponsive devices on the cars of the train will be connected with the respective sources of energy and energized to actuate the brake shoes into engagement with the respective wheels as previously described, thereby checking the speed of the train. To vary the contact between the brake shoes and the tires of the wheels, the lever 30 is actuated over the resistance grid 29 to place more or less resistance in the circuit, according as it is desired to decrease or increase the power of the electroresponsive devices. Should one section of the train separate from another incident to defective coupling heads, the levers 24 on the ends of the separated cars of the train will be relieved of the influence of the opposite box 22 and so swing into engagement with the contacts 23 under the action of the spring 26, thereby bridging the lines of conductors 1 on the sections of the train independently of the controller to effect an application of the brakes and so stop the respective sections of the train.

In applying my invention to electric trains, each car of the train is equipped with a controller as shown in Fig. 5 and each controller is adapted to be connected to and disconnected from the conductors 1 by means of a double pole single throw switch 31 so that the controllers may be cut out of the circuit when the cars are connected in train formation. The lever 30 of the controller is pivotally connected with one end of a connecting rod 32 and the opposite end of such rod 32 is connected to the throttle valve, when the system is installed in a steam driven locomotive, and to the controller lever, when the system is installed in an electrically operated motor car. Thus, the controller of the car and the brake mechanism may be controlled from a single lever.

While I have herein shown and described the preferred form of my invention by way of illustration, I wish it to be understood that I do not limit or confine myself to the precise details of construction herein described and delineated, as modification and variation may be made within the scope of the claim without departing from the spirit of the invention.

I claim:

In train brake apparatus, brake beams carried by each car of the train, a pair of conductors extending longitudinally of each car, an electroresponsive device and a source of electrical energy on each car connected in circuit with each other and with said conductors, means connecting the conductors of adjoining cars to one another, a controller connected in said conductors and operable to bridge the latter to energize the electroresponsive devices, contacts on each car connected with the conductors thereon respectively, a lever pivoted upon each car and adapted to engage said contacts to bridge the latter, a spring connected to said lever and acting to swing the same into engagement with the contacts, and means on each car for actuating the lever of an adjoining car to disengage the contacts in the coupling of the cars.

In testimony whereof I affix my signature in presence of two witnesses.

JAMES JORDAN TYSON.

Witnesses:
JNO. F. DILLARD,
GORDON O. McGEBEE.

Copies of this patent may be obtained for five cents each, by addressing the "Commissioner of Patents, Washington, D. C."